US00RE47579E

(19) United States
(12) Reissued Patent
Kwon

(10) Patent Number: US RE47,579 E
(45) Date of Reissued Patent: Aug. 20, 2019

(54) METHOD AND APPARATUS FOR TRANSMITTING CONTROL FRAME TO HIDDEN NODE IN WIRELESS LAN

(71) Applicant: SISVEL INTERNATIONAL S.A., Luxembourg (LU)

(72) Inventor: Chang-yeul Kwon, Suwon-si (KR)

(73) Assignee: SISVEL INTERNATIONAL S.A., Luxembourg (LU)

(21) Appl. No.: 13/895,958

(22) Filed: May 16, 2013

Related U.S. Patent Documents

Reissue of:
(64) Patent No.: 7,944,874
Issued: May 17, 2011
Appl. No.: 11/599,419
Filed: Nov. 15, 2006

U.S. Applications:
(60) Provisional application No. 60/756,216, filed on Jan. 5, 2006.

(30) Foreign Application Priority Data

Apr. 10, 2006 (KR) ..... 10-2006-0032408

(51) Int. Cl.
*H04W 4/00* (2018.01)
*H04W 48/08* (2009.01)
(Continued)

(52) U.S. Cl.
CPC ..... *H04W 48/08* (2013.01); *H04W 74/006* (2013.01); *H04W 74/08* (2013.01);
(Continued)

(58) Field of Classification Search
CPC ..... H04W 48/08; H04W 48/16; H04W 4/06; H04W 74/00; H04W 74/006;
(Continued)

(56) References Cited

U.S. PATENT DOCUMENTS 7,016,948 B1 * 3/2006 Yildiz ..... 709/221
7,269,153 B1 * 9/2007 Schultz ..... H04L 25/03834 370/338
(Continued)

FOREIGN PATENT DOCUMENTS

EP 0986214 A2 3/2000
JP 2002-217913 A 8/2002
(Continued)

OTHER PUBLICATIONS

"Adaptive Random Access Scheme based on Traffic Load and QoS in a Wireless Communication System"; Ki-Ho Lee and Doug-Ho Cho; Vehicular Technology Conference, 2003, VTC 2003-Spring, The 57th IEEE Semiannual, vol. 3, Apr. 22-35, 2003 pp. 1793-1797.
(Continued)

*Primary Examiner* — Ovidio Escalante
(74) *Attorney, Agent, or Firm* — Sughrue Mion, PLLC

(57) ABSTRACT

A method and apparatus informs nodes included in a wireless local area network (LAN) of how to avoid access collision in a wireless LAN. A wireless LAN access point or an independent basic service set (IBSS) control station receives a Contention-Free-End (CF-End) frame, compares a basic service set ID (BSSID) of the received CF-End frame of the access point or the IBSS, and rebroadcasts the received CF-End frame if the comparison result indicates that the two BSSIDs coincide with each other. Thus, all stations included in one BSS can receive the same time information for controlling medium access.

10 Claims, 9 Drawing Sheets

(51) Int. Cl.

| | |
|---|---|
| ***H04W 74/00*** | (2009.01) |
| ***H04W 74/08*** | (2009.01) |
| *H04W 8/26* | (2009.01) |
| *H04W 48/16* | (2009.01) |
| *H04W 88/08* | (2009.01) |
| *H04W 84/12* | (2009.01) |
| *H04W 88/04* | (2009.01) |
| *H04W 4/06* | (2009.01) |

(52) U.S. Cl.
CPC ..... *H04W 4/06* (2013.01); *H04W 8/26* (2013.01); *H04W 48/16* (2013.01); *H04W 74/00* (2013.01); *H04W 84/12* (2013.01); *H04W 88/04* (2013.01); *H04W 88/08* (2013.01)

(58) Field of Classification Search
CPC ..... H04W 74/08; H04W 84/12; H04W 88/04; H04W 88/08; H04W 8/26
USPC ..... 370/315, 319, 322, 324, 445, 447, 312, 370/328; 455/422.1
See application file for complete search history.

(56) References Cited

U.S. PATENT DOCUMENTS

| | | | | |
|---|---|---|---|---|
| 2002/0115458 | A1* | 8/2002 | Mizuno | H04W 74/02 455/507 |
| 2002/0141368 | A1 | 10/2002 | Cheung et al. | |
| 2002/0150095 | A1* | 10/2002 | Sherman | H04W 74/0808 370/389 |
| 2002/0152324 | A1 | 10/2002 | Sherman | |
| 2004/0181597 | A1* | 9/2004 | Ekl | H04L 1/16 709/227 |
| 2006/0041676 | A1* | 2/2006 | Sherman | 709/231 |
| 2007/0115853 | A1* | 5/2007 | Wentink | 370/252 |
| 2007/0115882 | A1* | 5/2007 | Wentink | 370/329 |
| 2007/0171858 | A1* | 7/2007 | Grandhi et al. | 370/328 |
| 2007/0291679 | A1 | 12/2007 | Kawakami et al. | |
| 2008/0095095 | A1 | 4/2008 | Adachi et al. | |
| 2009/0187661 | A1 | 7/2009 | Sherman | |
| 2011/0310872 | A1 | 12/2011 | Volpano | |

FOREIGN PATENT DOCUMENTS

| | | | |
|---|---|---|---|
| JP | 2003-18234 | A | 1/2003 |
| JP | 2003-174452 | A | 6/2003 |
| JP | 2004-535695 | A | 11/2004 |
| JP | 2005-513915 | A | 5/2005 |
| JP | 2005-223767 | A | 8/2005 |
| WO | 03/005653 | A1 | 1/2003 |
| WO | 2005/109764 | A1 | 11/2005 |

OTHER PUBLICATIONS

IEEE, "Part 11: Wireless LAN Medium Access Control (MAC) and Physical Layer (PHY) specifications, High-speed Physical Layer in the 5 GHz Band", Reaffirmed Jun. 12, 2003, total 91 pages, IEEE Std 802.11a-1999(R2003).

ANSI/IEEE, "Part 11: Wireless LAN Medium Access Control (MAC) and Physical Layer (PHY) Specifications", Adopted by the ISO/IEC and redesignated as ISO/IEC 8802-11:1999(E), Aug. 20, 1999, total 527 pages, ANSI/IEEE Std 802.11, 1999 Edition.

Michael Cloran; "Simulation of IEEE 802.11 PCF function in GIMoSim"; Dublin City University School of Electronic Engineering; Apr. 2004; 47 pgs.

Kohei Mizuno; "A Multichannel Media Access Control Protocol for Multihop Wireless Networks with Guaranteed Functions"; Electronics and Communications in Japan, Part 1, vol. 87, No. 4; 2004; Translated from Denshi Joho Tsushin Gakkai Ronbunshi, vol. J85-B, No. 12, Dec. 2002, pp. 2179-2188; 14 pgs.

Communication dated Dec. 8, 2017, from the European Patent Office in counterpart European Application No. 17194681.7.

Hao Zhu et al. "rDCF: A Relay-enabled Medium Access Control Protocol for Wireless Ad Hoc Networks" INFOCOM 2005. 24th Annual Joint Conference of the IEEE computer and communications societies. Proceedings IEEE Miami, FL, USA Mar. 13-17, 2005, Piscataway, NJ, USA, vol. 1, Mar. 13, 2005, (pp. 12-22) XP010829047.

Communication dated Jun. 9, 2017 issued by the European Patent Office in counterpart European Patent Application No. 06835313.5.

Communication dated Jun. 9, 2017 issued by the European Patent Office in counterpart European Patent Application No. 13155600.3.

Ki-Ho Lee and Dong-Ho Cho: A Multiple Access Collision Avoidance Protocol for Multicast Services in Mobile Ad Hoc Networks; Vehicular Technology Conference, 2003; The 57th IEEE Semiannual; IEEE Communications Letters.

"MiFi: A framework for Fairness and QoS Assurance in Current IEEE 802.11 Networks with Multiple Access Points"; Bejerano, Y. and Bhatia, R. S.; INFOCOM 2004. Twenty-third Annual Joint Conference of the IEEE Computer and Communications Societies, vol. 2, Mar. 7-11, 2004 pp. 1229-1240.

* cited by examiner

METHOD AND APPARATUS FOR TRANSMITTING CONTROL FRAME TO HIDDEN NODE IN WIRELESS LAN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATION

This application claims priority from Korean Patent Application No. 10-2006-0032408, filed on Apr. 10, 2006 in the Korean Intellectual Property Office, and U.S. Provisional Patent Application No. 60/756,216, filed on Jan. 5, 2006, in the U.S. Patent and Trademarks Office, the disclosures of which are incorporated herein in their entirety by reference.

BACKGROUND OF THE INVENTION

1. Field of the Invention

The present invention relates to a wireless local area network (LAN), and more particularly, to a method of informing nodes included in the wireless LAN of how to avoid access collisions in a wireless LAN.

2. Description of the Related Art

Medium access control (MAC) using a carrier sensing multiple access with collision avoidance (CSMA/CA) method is used in a wireless LAN.

In the CSMA/CA method, physical carrier sensing and virtual carrier sensing are used for carrier sensing. In physical carrier sensing, a physical layer (PHY) determines whether a received power equal to or greater than a specific value is detected, and informs a medium access control (MAC) layer of whether a medium is in a busy or idle state, thereby sensing a carrier. In virtual carrier sensing, if a MAC protocol data unit (MPDU) can be correctly extracted from a received PHY protocol data unit (PPDU), a header field of the MPDU, that is, a duration/ID field, is analyzed, and the medium is deemed to be in the busy state during a scheduled time for using the medium. Stations determine whether the medium is in the busy state by using the two carrier sensing methods, and do not access the medium if in the busy state.

Referring to FIG. 1, a MAC header of a frame transmitted through a general IEEE 802.11 compliant wireless LAN includes duration information indicating a time between when the frame is transmitted and when an ACK frame is received to confirm that the frame is received. After receiving the frame, the stations analyze the MAC header so that medium access is not tried for a duration of time, thereby avoiding collision. According to a feature of a wireless medium, all stations connected through the wireless LAN can physically receive all frames transmitted in a radio wave coverage area even if the frame is sent to a particular station.

In FIG. 1, a frame exchange sequence is shown in which a single MPDU and an ACK frame are involved. However, a plurality of MPDUs may be included in the single PPDU as shown in FIG. 2A. Referring to FIG. 2A, a transmitting station and a receiving station exchange a request-to-send (RTS) frame with a clear-to-send (CTS) frame so that other stations do not access the medium for a predetermined time. The time obtained by the transmitting station when using an RTS/CTS exchange sequence is referred to as a transmission opportunity (TxOP). A network allocation vector (NAV) is a remaining time until the medium is available. Stations, except for the transmitting station and the receiving station, determine their NAV times using duration fields of a RTS frame, a CTS frame, and a data frame. Referring to FIG. 2A, the transmitting station sends a plurality of MPDUs included in a single PPDU. Furthermore, the transmitting station sends a plurality of PPDUs within a TxOP obtained by one RTS/CTS exchange sequence. In this case, data having a size larger than that of the general case of FIG. 1 is transmitted, and thus if an error occurs, more time is required to retransmit the data, thereby causing a longer NAV. If the longer NAV is determined, even when the transmitting station has no data to be sent, other stations do not access the medium for the remaining TxOP, which may cause a waste of channels. To avoid this, the transmitting station sends a Contention-Free-End (CF-End) frame. This is illustrated in FIG. 2B. If the TxOP is still left but the medium is no longer used, the transmitting station sends the CF-End frame to cancel the remaining TxOP. Thereafter, other stations which receive the CF-End frame contend again for medium access.

FIGS. 3A to 3C illustrate CF-End frames used for ensuring fair contention among stations for medium access.

As described above, in virtual carrier sensing, the CSMA/CA can be effectively used only when the MAC protocol data unit/PHY service data unit (MPDU/PSDU) are analyzed without errors. That is, virtual carrier sensing can be carried out only when a MAC header value can be correctly read. However, if data is sent using a high data transfer rate and an error occurs due to an unstable channel condition, or a receiving station cannot cope with the high data transfer speed, virtual carrier sensing cannot be carried out because the received MPDU/PSDU cannot be analyzed. Therefore, the CSMA/CA method becomes ineffective. Accordingly, when a legacy station which operates in accordance with the IEEE 802.11 a/b/g standard and a high throughput (HT) station having a higher capability than the legacy station coexist in the wireless LAN, and when a HT format is sent, the legacy station cannot analyze the HT format frame, causing ineffective operation of a CSMA/CA mechanism. The HT station may be a multi-input-multi-output (MIMO) station which has data transferring capability superior to a station operating in accordance with the 802.11 a/b/g standard.

In order to solve the above problems, an IEEE 802.11n standard has been in development. Referring to FIG. 3A, in the 802.11n standard, if HT stations and legacy stations coexist in the wireless LAN, a PHY header of the HT format frame is used as a legacy format (L-Preamble, L-SIG) so as to be recognized by the legacy stations. In addition, a RATE field value and a LENGTH field value are determined so that the legacy stations can recognize a time required after an L-SIG field begins and until an ACK frame is received, by analyzing the RATE field and the LENGTH field included in the PHY header. Hereinafter, the time specified by the RATE field and the LENGTH field will be referred to as an extended PHY protection (EPP).

When the EPP is used, medium access collision can be avoided, but stations have to contend unfairly to attain permission for medium access.

Referring to FIG. 3B, which illustrates the above problem, even if a legacy station can read the PHY header, the legacy station cannot read the next fields, that is, HT format, which leads to an error. Then, the PHY, or baseband layer, indicates the error occurrence to the MAC layer. The error indication begins where the EPP ends. From this point, the legacy station participates in contention for medium access after waiting for a longer time than the HT station. When an error occurs because the legacy station cannot read the HT format frame, the legacy station starts to back-off after standing by for a time defined in extended inter-frame space (EIFS, 94 us in IEEE 802.11a). This is different from the HT station which starts to back-off after standing by for a time corresponding to Distributed Coordination Function (DCF) inter-frame space (DIFS, 34 us in IEEE 802.11a).

FIG. 3C illustrates a CF-End frame used for solving this unfair contention problem. The receiving station broadcasts a CF-End frame when a short inter-frame space (SIFS) elapses after an ACK frame for a HT format data frame is received. Since the CF-End frame indicates that the medium is available, the HT station which receives the CF-End frame immediately participates in the contention for medium access without having to wait until the EIFS time elapses.

Accordingly, correct CSMA/CA can be carried out in the wireless LAN by using the CF-End frame, thereby ensuring a fair contention among stations. However, if the CF-End frame is not sent to all stations included in the wireless LAN, such advantages cannot be attained. As shown in FIG. 4, a hidden node problem may occur in the wireless LAN. In FIG. 4, a station A broadcasts a frame. Radio wave coverage of each station is indicated by a dotted line. Referring to FIG. 4, according to a feature of the wireless LAN, a station C can recognize a frame sent from the station A, but a station B may not recognize the frame. In this case, if the station B mistakenly recognizes that a medium is available by carrier sensing and thus tries to send the frame, medium access collision occurs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus which allow stations connected in a wireless LAN to receive a control frame having information regarding media access.

According to an aspect of the present invention, there is provided a method of delivering a control frame for a device which communicates through a wireless LAN, the method comprising receiving a control frame including time information for controlling medium access, checking recipient address information included in the control frame, and broadcasting the received control frame in a selective manner based on the checking result.

In the aforementioned aspect of the present invention, the control frame may be a CF-End frame, and in the broadcasting the received control frame, if the checking result indicates that a basic service set ID (BSSID) recorded in the CF-End frame coincides with a BSSID of a BSS (basic service set), the CF-End frame may be broadcast.

In addition, in the broadcasting the received control frame, when a time of SIFS short inter-frame space (SIFS) elapses after the CF-End frame is received in the receiving a control frame, the received CF-End frame may be broadcast.

In addition, if the wireless LAN is an infrastructure BSS, the device is an access point of the infrastructure BSS, and the wireless LAN is an IBSS (independent BSS), then the device may be an IBSS control station that sends a beacon frame.

According to another aspect of the present invention, there is provided a computer-readable medium having embodied thereon a computer program for executing the method above.

According to another aspect of the present invention, there is provided an apparatus for delivering a control frame received through a wireless LAN, the apparatus comprising a recipient address information checking unit which checks recipient address information included in the control frame when the control frame including time information for medium access is received, and a resending unit which broadcasts the received control frame in a selective manner based on the checking result.

According to another aspect of the present invention, there is provided an access point having the apparatus above.

According to another aspect of the present invention, there is provided a wireless LAN station which has the apparatus above, and operates the apparatus only when the wireless LAN station operates as an IBSS control station that sends a beacon frame in the independent BSS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 1:
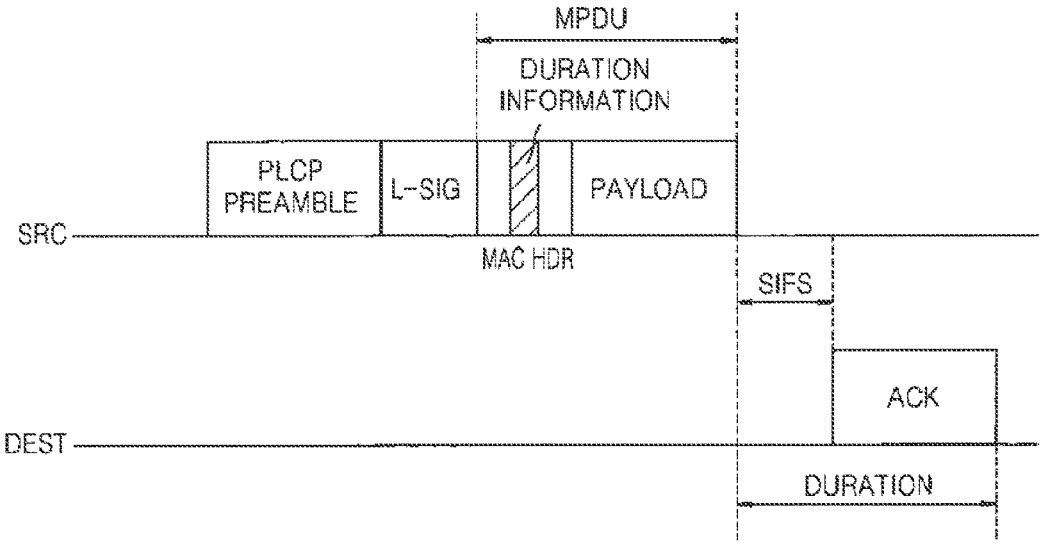
FIG. 1 (RELATED ART)
FIG. 1 is a diagram illustrating a carrier sensing multiple access with collision avoidance (CSMA/CA) mechanism used in a wireless LAN.
Figure 2A:
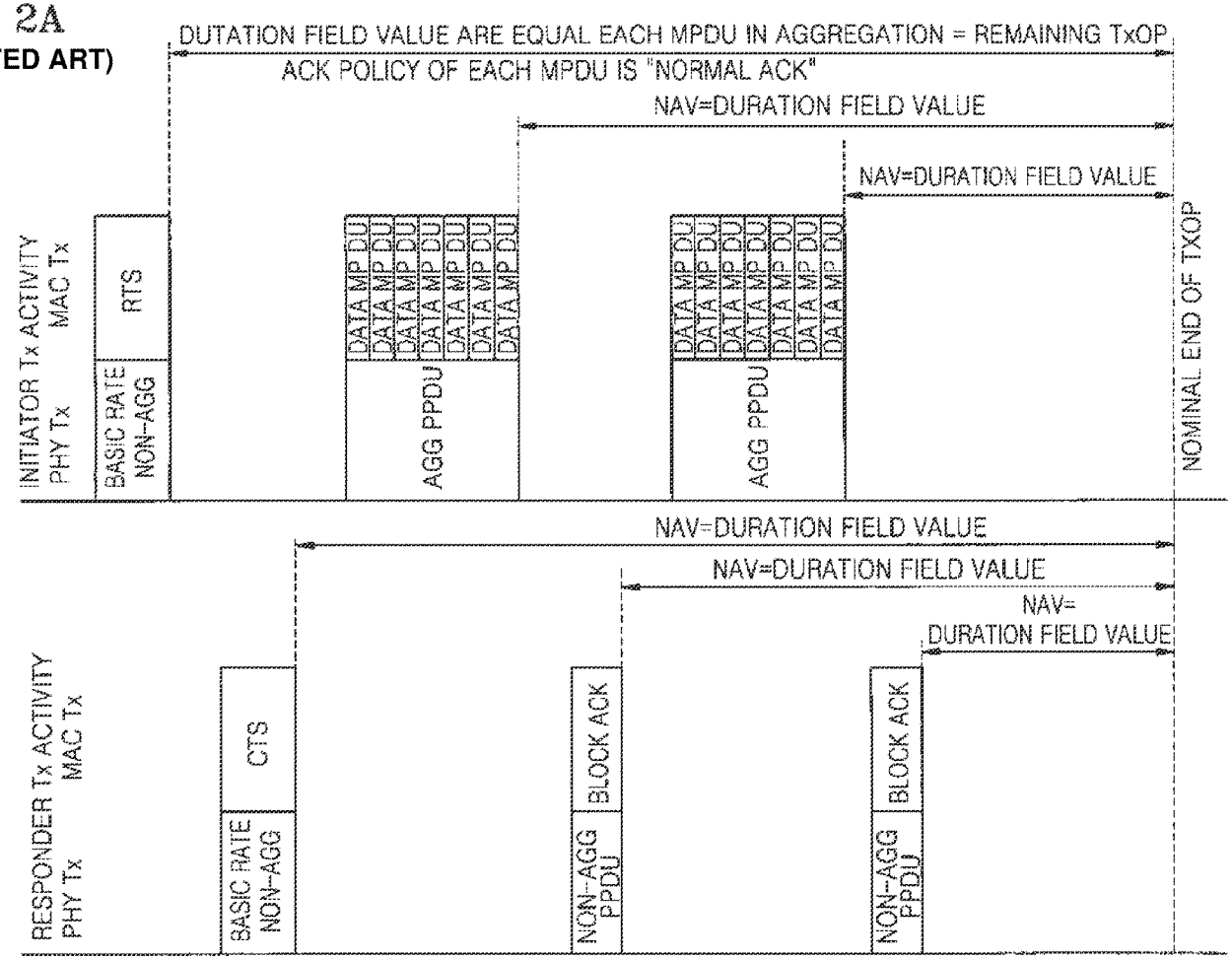
FIG. 2A (RELATED ART)
FIGS. 2A and 2B are diagrams illustrating a usage of a CF-End frame.
Figure 2B:
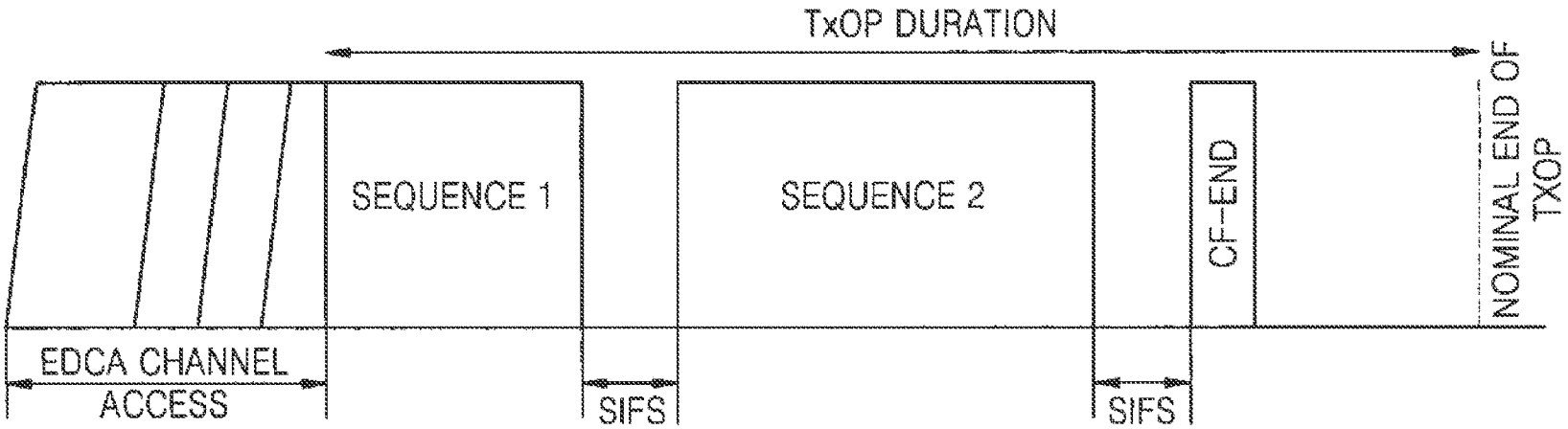
FIG. 2B (RELATED ART)
Figure 3A:
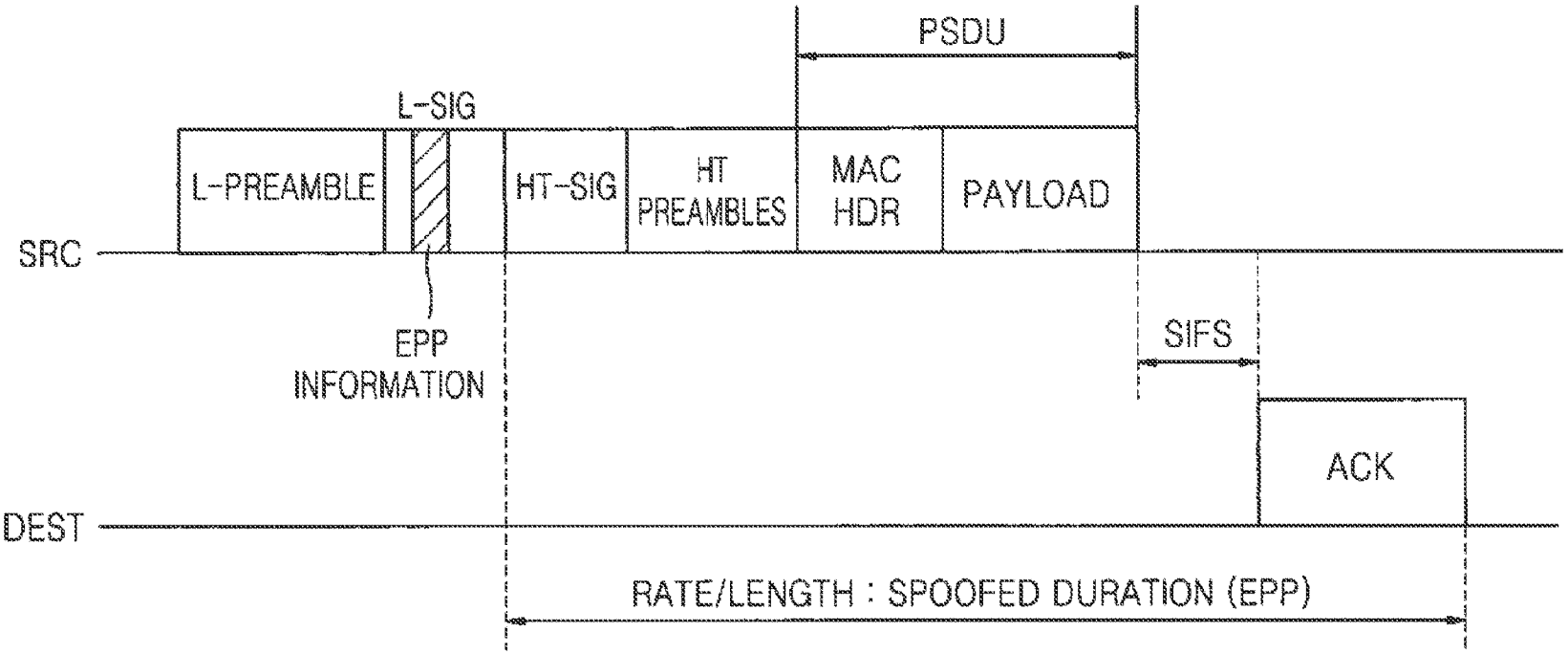
FIG. 3A (RELATED ART)
FIGS. 3A to 3C are diagrams illustrating another usage of a CF-End frame.
Figure 3B:
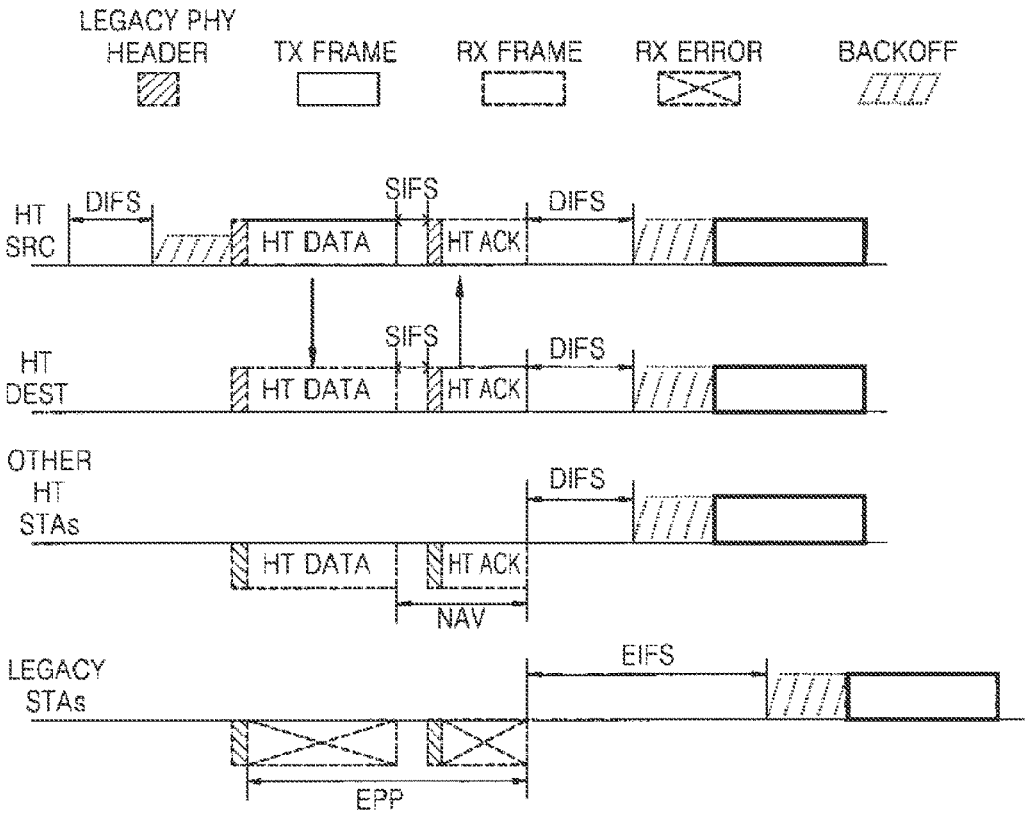
FIG. 3B (RELATED ART)
Figure 3C:
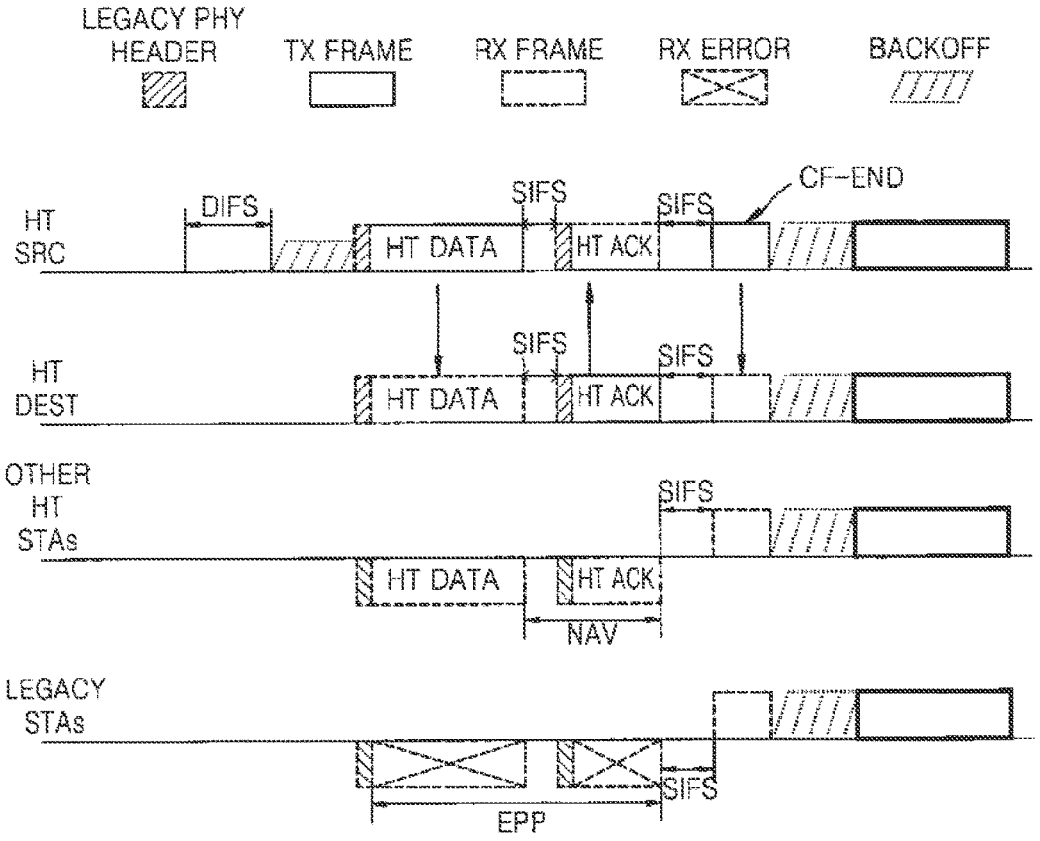
FIG. 3C (RELATED ART)
Figure 4:
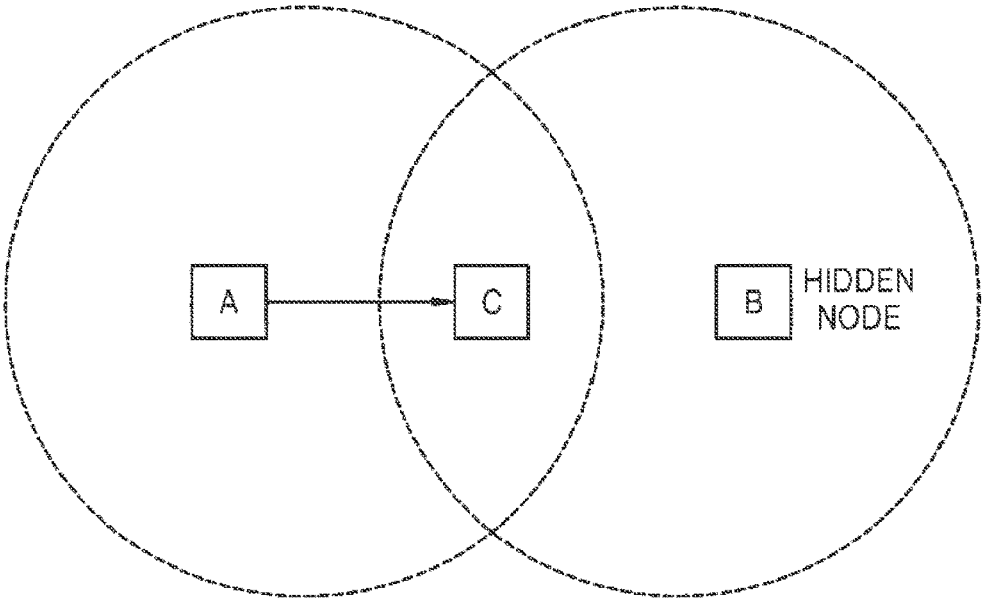
FIG. 4 (RELATED ART)
FIG. 4 is a diagram illustrating a hidden node problem.
Figure 5:
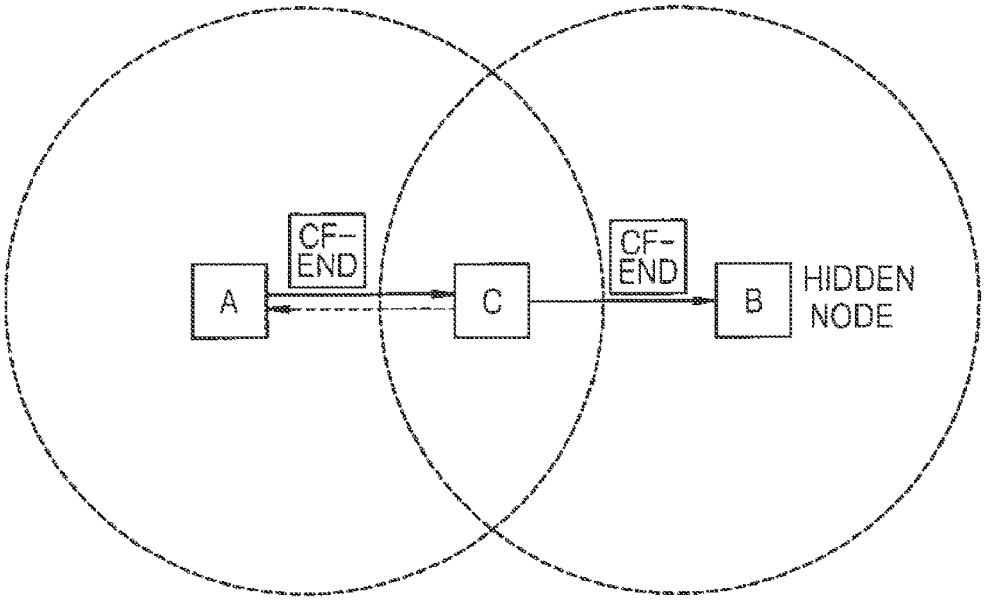
FIG. 5 is a diagram illustrating a principle of solving a hidden node problem according to an exemplary embodiment of the present invention.

FIG. 5 illustrates a principle of solving a hidden node problem according to an exemplary embodiment of the present invention. Referring to FIG. 5, a station C can receive a CF-End frame sent from a station A. However, a station B cannot receive the CF-End frame sent from the station A since station B is located outside of the radio wave coverage of station A. Thus, the station B cannot reset a network allocation vector (NAV) in synchronization with station C. According to an exemplary embodiment of the present invention, station C, which can communicate with station A and station B, delivers the CF-End frame received from station A to station B, thereby solving a hidden node problem. Preferably, in an infrastructure basic service set (BSS), the CF-End frame is delivered by an access point, and in an independent BSS (IBSS), the CF-End frame is delivered by an IBSS control station that has most recently sent a beacon frame.

Although the case where a control CF-End frame is used so that the transmitting station returns the TxOP has been described, the present exemplary embodiment is not limited thereto, and other types of frames may be used if the frames have a function for resetting the NAV of each station, and if a duration field of each MAC header thereof is set to 0. The same will be also applied hereinafter.

Figure 6:
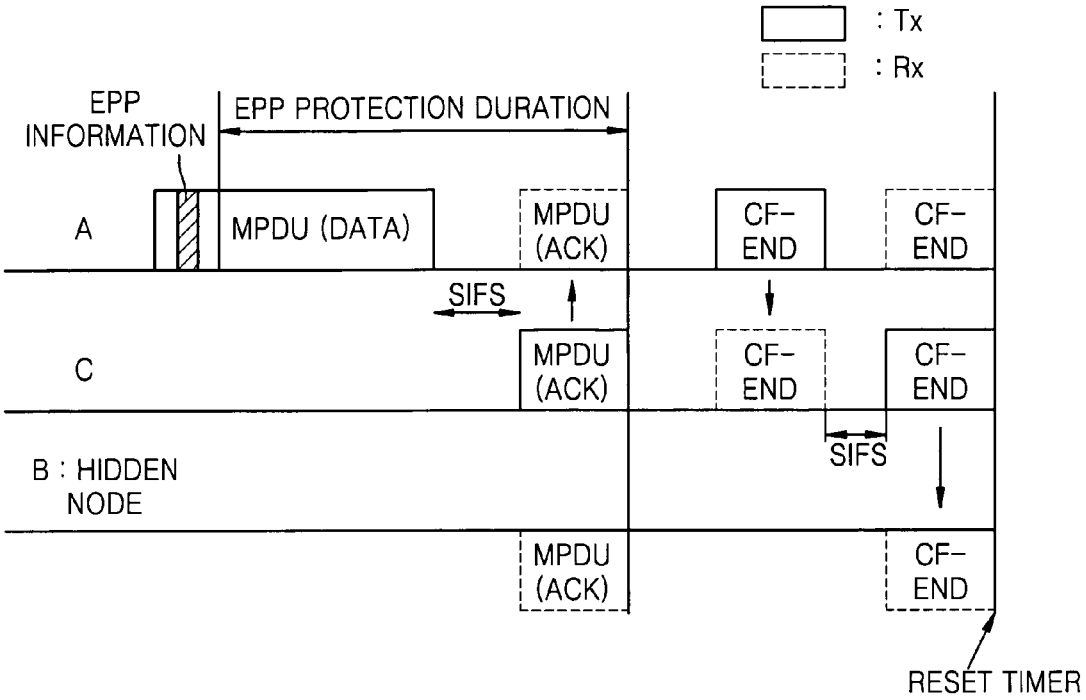
FIG. 6 is a diagram illustrating a method of delivering a CF-End frame to a hidden node according to an exemplary embodiment of the present invention.

FIG. 6 is a diagram illustrating a method of delivering a CF-End frame to a hidden node according to an exemplary embodiment of the present invention.

Referring to FIG. 6, if a station B is a hidden node that cannot receive a CF-End frame sent from a station A, a station C delivers the CF-End frame sent from station A to station B. That is, the CF-End frame that is broadcast by station A is broadcast again by station C, and station B receives the CF-End frame that is broadcast by station C. In this case, it is desirable that the station B rebroadcasts the CF-End frame when the short inter-frame space (SIFS) elapses after the CF-End frame sent from station A is received. If an elapsed time is longer than the SIFS, another station which has received the CF-End frame may determine that the medium is available and may try to send the CF-End frame.

Station C is not allowed to resend all received CF-End frames. Medium access control (MAC) of each station is performed for a medium used in one BSS. Thus, if station C is located in a position in which frames sent from two or more different BSSs can be received, an error may occur during the MAC of the stations.

Figure 7:
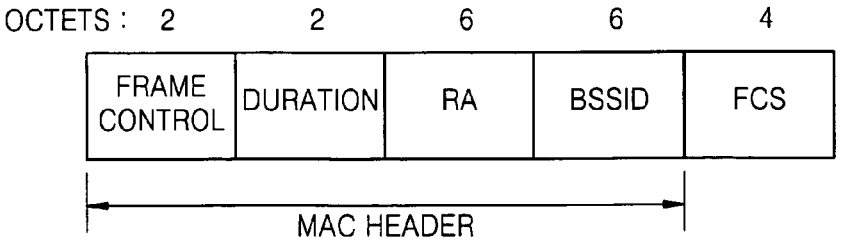
FIG. 7 is a diagram illustrating a configuration of a CF-End frame.

Therefore, when station C receives the CF-End frame, station C reads its address field to compare a basic service set ID (BSSID) of the CF-End frame with a BSSID of a BSS in which station C is included. Then, only when the two BSSIDs coincide with each other, station C resends the CF-End frame. Otherwise, station C drops the CF-End frame. FIG. 7 illustrates a configuration of the CF-End frame.

Figure 8:
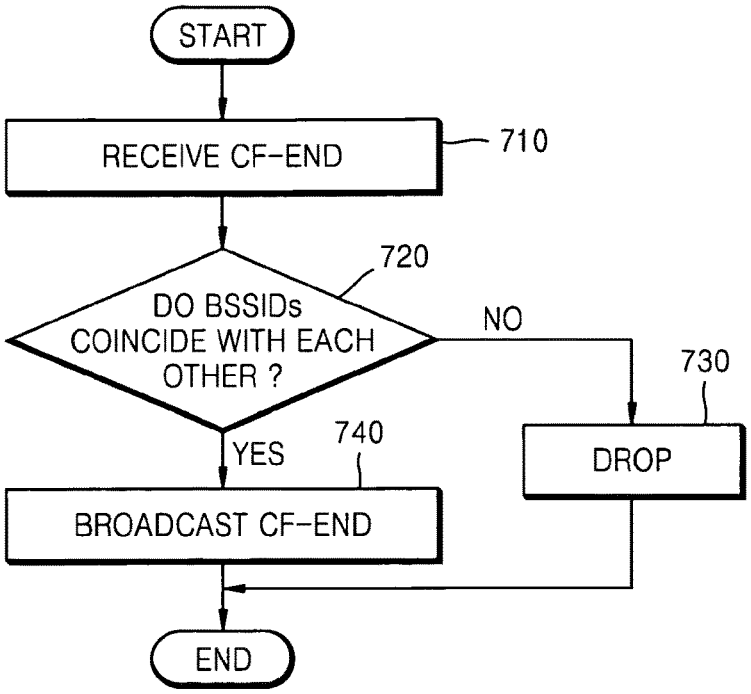
FIG. 8 is a flowchart illustrating a method of delivering a CF-End frame to a hidden node according to an exemplary embodiment of the present invention.

FIG. 8 is a flowchart illustrating a method of delivering a CF-End frame to a hidden node according to an exemplary embodiment of the present invention.

An access point or an IBSS control station receives a CF-End frame (operation 710), and then compares an BSSID recorded in an address field of the received CF-End frame with a BSSID of a BSS where the access point or the IBSS is included (operation 720). If the BSSID recorded in the address field of the CF-End frame coincides with the BSSID of the BSS where the access point or the IBSS is included, the access point or the IBSS rebroadcasts the received CF-End frame so that the CF-End frame can be delivered to a hidden node of the BSS where the access point or the IBSS is included (operation 740). Otherwise, the access point or the IBSS drops the CF-End frame (operation 730).

Figure 9:
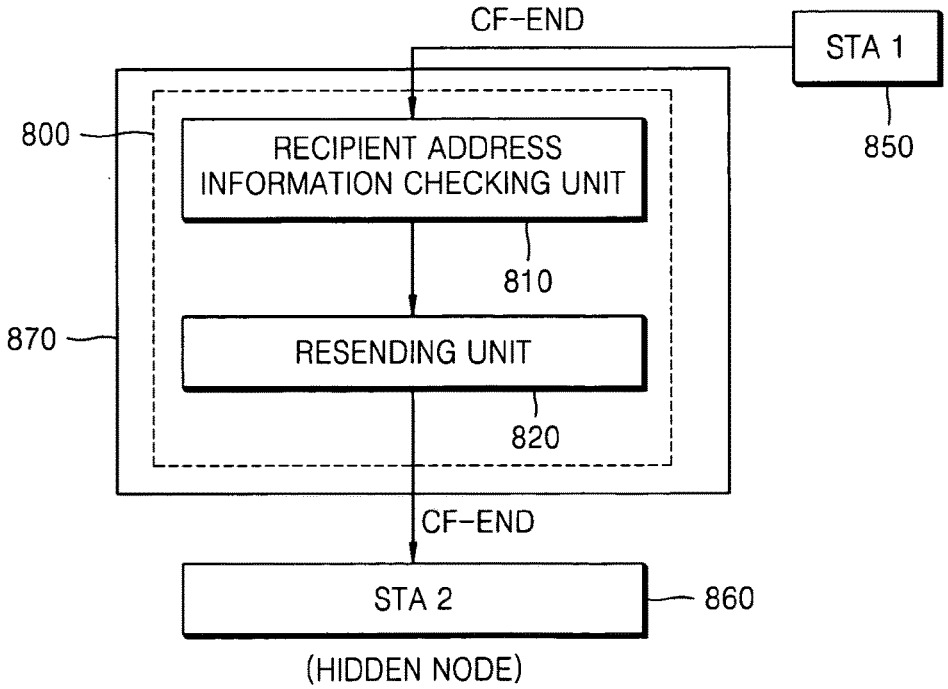
FIG. 9 is a block diagram of an apparatus for delivering a CF-End frame to a hidden node according to an exemplary embodiment of the present invention.

FIG. 9 is a block diagram of an apparatus for delivering a CF-End frame to a hidden node according to an exemplary embodiment of the present invention.

Referring to FIG. 9, an apparatus 800 for delivering a CF-End frame to a hidden node includes a recipient address information checking unit 800 and a resending unit 820. In the present exemplary embodiment, it is assumed that the apparatus 800 is included in an access point 870, but the apparatus 800 may be included in an IBSS control station sending a beacon frame, as described above.

The recipient address information checking unit 800 receives the CF-End frame sent from a first station 850, and then compares a BSSID recorded in an address field of the received CF-End frame with a BSSID of a BSS which is controlled by the access point 870. If the two BSSIDs do not coincide with each other, the recipient address information checking unit 800 drops the CF-End frame.

If the BSSID recorded in the address field of the received CF-End frame coincides with the BSSID of the BSS which is controlled by the access point 870, the resending unit 820 broadcasts the received CF-End frame so that the CF-End frame can be delivered to a second station 860 that is a hidden node.

Accordingly, in the present invention, all stations included in one BSS can receive the same time information for controlling medium access, thereby solving a hidden node problem. Ultimately, a correct CSMA/CA mechanism can be implemented in a wireless LAN, and a fair contention for medium access among the stations can be ensured.

The exemplary embodiments of the present invention can be written as computer programs which are embodied on computer readable recording media and can be implemented in general-use digital computers that execute the programs using computer readable recording media. Examples of the computer readable recording media include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of [delivering] *transmitting* a [control] *Contention Free-End* (*CF-End*) frame [for a device which communicates] through a wireless local area network (LAN), the method comprising *steps performed by a first station of*:

[receiving a control frame including time information for controlling medium access and recipient address information;]

checking [recipient address information] *a Basic Service Set ID* (*BSSID*) *included in a CF-End frame, the CF-End frame including a duration field of a MAC header set to zero*; and broadcasting [the received control frame in a selective manner based on a checking result], *to a second station, the CF-End frame directly in response to determining the Basic Service Set ID* (*BSSID*) *in the CF-End frame matches a BSSID of a Basic Service Set* (*BSS*) *where said first station is included, wherein the step of broadcasting the CF-End frame to said second station comprises the step of broadcasting the CF-End frame when a Short Inter Frame Space* (*SIFS*) *elapses after the CF-End frame was received, and*

[wherein, in the control frame, a duration field of a MAC (medium access control) header has a value of 0, wherein the control frame is a Contention-Free-End (CF-End) frame, wherein the broadcasting the received control frame comprises broadcasting the received CF-END frame if the checking result indicates that a basic service set ID (BSSID) recorded in the CF-End frame coincides with a BSSID of a BSS (basic service set), and wherein the broadcasting the received control frame further comprises broadcasting the received CF-END frame when a short inter-frame space (SIFS) elapses after the CF-End frame is received] *wherein a Network Allocation Vector (NAV) of said second station is reset upon a receipt of the CF-End frame.*

2. The method of claim 1, wherein [the] *said* wireless LAN is an infrastructure BSS, and [the device] *said first station* is an access point of [the] *said* infrastructure BSS.

[3. A non-transitory computer-readable medium having embodied thereon a computer program for executing the method of claim 2.]

4. The method of claim 1, wherein [the] *said* wireless LAN is an [IBSS (]independent BSS (*IBSS*), and [the device] *said first station* is an IBSS control station [that sends] *configured to send* a beacon frame.

[5. A non-transitory computer-readable medium having embodied thereon a computer program for executing the method of claim 4.]

[6. A non-transitory computer-readable medium having embodied thereon a computer program for executing the method of claim 1.]

7. An apparatus for [delivering] *transmitting* a [control] *Contention Free-End* (*CF-End*) frame [received through a wireless LAN], the apparatus comprising:

a [recipient address information checking unit which checks recipient address information] *receiver configured to check a Basic Service Set ID* (*BSSID*) included in [the control] *a CF-End* frame [when the control frame including time information for medium access is received], *the CF-End frame including a duration field of a MAC header set to zero*; and a [resending unit which broadcasts the received control] *transmitter configured to broadcast the CF-End* frame [in a selective manner based on the checking result,] *directly in response to determining the Basic Service Set ID in the CF-End frame matches a BSSID of a Basic Service Set (BSS) where the apparatus is included, wherein said transmitter is configured to broadcast the CF-End frame when a Short Inter Frame Space (SIFS) elapses after the CF-End frame was received, and*

[wherein, in the control frame, a duration field of a MAC header has a value of 0, wherein the control frame is a CF-End frame, wherein, the resending unit broadcasts the CF-End frame if the checking result indicates that a recipient address recorded in the CF-End frame is a broadcast address, and a BSSID recorded in the CF-End frame coincides with a BSSID of a BSS (basic service set), and wherein, the resending unit broadcasts the received CF-End frame when a SIFS elapses after the CF-End frame] *wherein a Network Allocation Vector (NAV) of a recipient of the CF-End frame is reset upon a receipt of the CF-End frame.*

8. An access point comprising the apparatus of claim 7.

9. A wireless LAN station which comprises the apparatus of claim 7, and [operates] *is configured to operate* the apparatus only when the wireless LAN station operates as an [IBSS] *independent BSS* control station [that sends] *configured to send* a beacon frame in the independent BSS.

*10. The method of claim 1, wherein the CF-End frame is transmitted by said first station to indicate a completion of a transmission opportunity of said first station.*

*11. The method of claim 10, wherein another station that receives the CF-End frame resets a Network Allocation Vector (NAV) so said another station is operable to contend for medium access.*

*12. The apparatus of claim 7, wherein said apparatus is configured to transmit the CF-End frame to indicate a completion of a transmission opportunity.*

*13. The apparatus of claim 12, wherein another station that is configured to receive the CF-End frame is configured to reset a Network Allocation Vector (NAV) so said another station is operable to contend for medium access.*

* * * * *